United States Patent [19]

Grögler et al.

[11] Patent Number: 5,064,875

[45] Date of Patent: Nov. 12, 1991

[54] PROCESS FOR THE PREPARATION OF HEAT-STABLE POLYURETHANE UREA ELASTOMERS

[75] Inventors: Gerhard Grögler; Urs Thiery; Andreas Ruckes, all of Leverkusen; Richard Kopp; Heinrich Hess, both of Cologne, all of Fed. Rep. of Germany

[73] Assignee: Bayer Aktiengesellschaft, Leverkusen, Fed. Rep. of Germany

[21] Appl. No.: 620,986

[22] Filed: Nov. 30, 1990

[30] Foreign Application Priority Data

Dec. 6, 1989 [DE] Fed. Rep. of Germany ....... 3940270

[51] Int. Cl.$^5$ .............................................. C08G 18/14
[52] U.S. Cl. .................................. 521/159; 521/163; 528/64; 528/79
[58] Field of Search .................. 521/159, 163; 528/64, 528/79

[56] References Cited

U.S. PATENT DOCUMENTS

| | | | |
|---|---|---|---|
| 3,105,062 | 9/1963 | Graham et al. | 260/75 |
| 3,891,606 | 6/1975 | Kogon | 260/77.5 AM |
| 3,926,922 | 12/1975 | Baron et al. | 260/77.5 AM |
| 4,663,415 | 5/1987 | Grogler et al. | 528/61 |
| 4,808,691 | 2/1989 | Konig et al. | 528/76 |
| 4,870,206 | 9/1989 | Sanders et al. | 560/359 |

FOREIGN PATENT DOCUMENTS 1122699 1/1962 Fed. Rep. of Germany .
2635400 9/1978 Fed. Rep. of Germany .
70-9195 4/1970 Japan .

*Primary Examiner*—Maurice J. Welsh
*Attorney, Agent, or Firm*—Joseph C. Gil; Richard E. L. Henderson

[57] ABSTRACT

This invention relates to a process for preparing polyurethane urea elastomers by reacting (a) compounds containing at least two isocyanate-reactive groups and having a molecular weight in the range from about 400 to about 10,000; (b) polyisocyanates; and (c) aromatic diamines corresponding to the formula

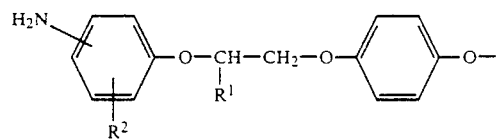

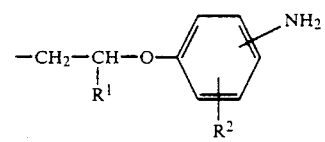

wherein $R^1$ and $R^2$ are independently hydrogen or alkyl.

18 Claims, No Drawings

PROCESS FOR THE PREPARATION OF HEAT-STABLE POLYURETHANE UREA ELASTOMERS

BACKGROUND OF THE INVENTION

This invention relates to a simplified process for the preparation of polyurethane urea elastomers in which solid, high-melting aromatic diamines are reacted with polyisocyanates or isocyanate prepolymers in a heterogeneous reaction.

The preparation of polyurethane urea elastomers from polyisocyanates, relatively high molecular weight polyhydroxyl compounds, and aromatic diamines is known. To guarantee reasonable processing times for reactive systems of such starting components, reactive aromatic isocyanates generally used on an industrial scale are preferably reacted with sluggishly reacting diamines. In practice, diamines that have been successfully used in this way are primarily aromatic diamines of which the basicity and, thus, the reactivity to isocyanates have been reduced by introduction of halogen or carboxy substituents. One example of such diamines is 3,3'-dichloro-4,4'-diaminodiphenylmethane ("MOCA") which has previously been the most widely used such diamine.

U.S. Pat. No. 3,891,606 discloses the crosslinking of isocyanate prepolymers of polyhydroxyl compounds and excess polyisocyanates with aromatic diamines in which the reactivity to isocyanate groups has been reduced by complexing with certain alkali metal salts. A disadvantage of this process is that it is confined to two special aromatic diamines. In addition, the complex between the aromatic diamine and the alkali metal salt must be prepared in a separate process step.

Another way to control the reaction rate between polyisocyanates and aromatic diamines is to carry out the reaction in an organic solvent. Processes of this type are disclosed, for example, in U.S. Pat. No. 3,926,922 and in Japanese 70/9195. A disadvantage of using organic solvents is obvious. The risk of fire and explosions is increased and the solvent must be recovered economically and ecologically in a further process step.

Before the present invention, little was known about the preparation of polyurethane ureas by reaction of polyisocyanates with aromatic diamines in heterogeneous phase. According to the prior art, aromatic diamines of relatively high melting point, which generally are of particular interest on an industrial scale, either are used in dissolved form, which involves the disadvantages just mentioned, or are reacted with polyisocyanates in the melt. The processing of aromatic diamines in the melt is described, for example, in U.S. Pat. No. 3,926,922 (mentioned above) or in German Auslegeschrift 1,122,699. German Auslegeschrift 1,122,699 relates to a process for the preparation of polyurethane elastomers by crosslinking liquid isocyanate prepolymers by reaction in molds with mixtures of primary diamines and compounds containing several hydroxyl groups. In this latter process, a dispersion of a powder-form crystalline diamine in a liquid polyester or polyether containing several hydroxyl groups or in castor oil is introduced into the prepolymer at a temperature below the melting point of the diamine. The mixture is cured as a melt by known methods at temperatures above the melting point of the diamine used in the mixture. In this process, therefore, the actual "amine crosslinking" reaction takes place in a liquid, homogeneous phase. A particular disadvantage of the process disclosed in German Auslegeschrift 1,122,699 is the need for the high temperatures which must be applied in the processing of high-melting diamines such as 1,5-naphthylenediamine (m.p. 189° C.) or 4,4'-diaminodiphenyl ether (m.p. 186° C.).

U.S. Pat. No. 3,105,062 discloses a process for the preparation of polyurethane ureas in which relatively high molecular weight preadducts containing isocyanate groups are reacted with preferably aromatic diamines in heterogeneous phase. The resultant reaction mixtures cure at a temperature at which the "two-phase system" changes into a "one-phase system". This temperature is generally in the range from 100° to 170° C. The aromatic diamines disclosed in U.S. Pat. No. 3,105,062, however, are soluble, albeit to only a limited extent, in the reaction medium (the NCO preadduct). Consequently, uncontrollable preliminary reactions take place during the mixing of the two components, even at room temperature, and the reaction mixtures thicken in a very short time and form partly paste-like formulations. These paste-like formulations are difficult to process by the standard casting method and, accordingly, must be brought into the required form by applying pressure before they are actually cured by heating. According to U.S. Pat. No. 3,105,062, the stability of the thickened reaction mixtures in storage (pot life) is sufficient for further processing (that is, molding under pressure and coating), amounting to several hours. It is apparent from the Examples that the preferred reaction mixtures are those having a maximum pot life of about one hour. Accordingly, these mixtures cannot be regarded as long-term systems. In addition, U.S. Pat. No. 3,105,062 specifically points out that the use of the disclosed diamines—present only in solid form—in the one-shot process leads to unsatisfactory polyurethane moldings. The unwanted preliminary reaction of the diamine with the diisocyanate takes place to an increased extent, the poorly soluble polyurea precipitating in the reaction mixture and no longer reacting.

German Offenlegungsschrift 2,635,400 discloses another process for the preparation of polyurethane urea elastomers in which aromatic diamines are reacted as chain-extending agents in a single-stage or multi-stage process. This process is characterized by the use of aromatic diamines having a melting point above 130° C. that are present in the reaction mixtures in solid form. The heat curing of such mixtures takes place at a temperature in the range from 80° to 120° C., that is, below the melting point of the aromatic diamine. By virtue of the choice of the corresponding diamines as chain-extending agents, the NCO-containing preadduct (also referred to as an NCO prepolymer) is not involved in a premature preliminary reaction that results in thickening of the mixtures. Accordingly, systems of this type can be readily processed even by casting. Since the pot life of these reactive systems is considerably increased, many aromatic diamines, which were difficult to process by the previously known method, may be used in this process. It can be seen from the examples of German Offenlegungsschrift 2,635,400 that the pot life of the liquid reaction mixtures ranges from a few minutes to several hours, depending on the reactivity or solubility of the aromatic diamine. For standard processing conditions, for example, in the hand casting process, these reaction mixtures, particularly those having relatively long pot lives, can generally be processed without significant difficulties. In contrast, problems arise if, as a result of machine failures or other required stoppages, there is a relatively long interruption between the preparation of the reaction mixtures and the curing phase. Accordingly, the need for long processing times at low temperature and for short curing times at elevated temperature is increasingly more urgent in practice.

The final polyurethane plastics are generally intended to exhibit favorable mechanical properties and, in many cases, a level of thermal stability adapted to a particular application. According to the prior art, the thermal stability of polyurethane elastomers depends largely on the type of chain-extending agent used. For example, if glycolic chain-extending agents are used for the preparation of elastomers, the resultant polyurethane moldings have lower thermal stability than when using compounds containing amino groups. There are, of course, also distinct differences in thermal stability within the particular type of chain-extending agents (compounds containing OH or $NH_2$ groups).

Accordingly, the object of the present invention was to find a process for the preparation of polyurethane ureas in which the starting components of the particular reaction systems (high molecular weight polyols or NCO preadducts and low molecular weight chain-extending agents containing $NH_2$ groups and, optionally, other auxiliaries and additives) remain unreacted for several weeks at room temperature or, optimally, for at least 14 days at a temperature of about 50° C. Such reaction mixtures may thus be regarded as "one-component systems" that cure only under the effect of relatively high temperatures. In addition, it is desirable that the mixtures that are capable of being cast at the processing temperature should be curable in economically useful reaction times.

The present invention is also based on the concept of finding suitable chain-extending agents containing amino groups which have only minimal solubility in the starting component (for example, in the NCO preadduct) at low temperatures but which have high solubility at relatively high temperatures, so that the polyurethane urea assumes a high molecular weight structure during the curing phase.

Another object of the present invention was to find a process for the preparation of polyurethane urea elastomers in which high-quality elastomers of high thermal stability are obtained.

It has now surprisingly been found that solid, high-melting diamines corresponding to the formula

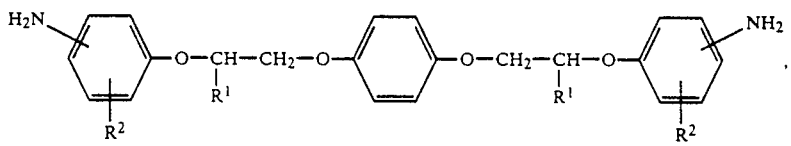

in which the $NH_2$ groups are in the o-, m- or p-position to the ether oxygen and $R^1$ and $R^2$ represent hydrogen or alkyl groups (preferably methyl groups), give reaction mixtures that are stable in storage at room temperature when processed by the one-shot process or prepolymer process. Reaction systems such as these have a stability in storage of days to weeks at about 50° C.

For compounds in which $R^1$ and $R^2$ are hydrogen and each $NH_2$ group is para to the ether oxygen, one-component systems having indefinite stability in storage at room temperature or at elevated temperatures of up to about 50° C. are obtained. A precondition in this regard is that the combination should be protected against the effect of atmospheric moisture in order to avoid unwanted reaction of the NCO groups with water.

SUMMARY OF THE INVENTION

The present invention relates to a process for the preparation of polyurethane urea elastomers comprising reacting
(a) compounds containing at least two isocyanate-reactive groups and having a molecular weight in the range from about 400 to about 10,000 (preferably in the range from 400 to 6,000);
(b) polyisocyanates;
(c) aromatic diamines corresponding to the formula

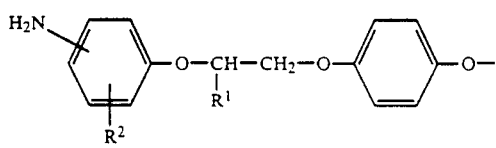

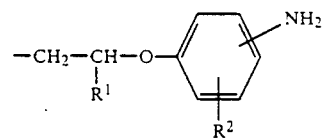

wherein $R^1$ and $R^2$ are independently hydrogen or alkyl (wherein the alkyl is preferably $C_1$-$C_6$ alkyl or more preferably methyl); and
(d) optionally, auxiliaries and additives known in polyurethane chemistry.

In the representation for diamines (c), each $NH_2$ group can be in the o-, m- or p-position (preferably in the p-position) relative to the ether oxygen atoms attached to the same benzene ring. The $R^2$ groups, of course, can be attached at any of the remaining positions on the benzene ring.

These systems may then be cured at any time by application of heat (preferably 140° to 200° C.). Polyurethane elastomers having very good mechanical properties and high thermal stability are obtained.

DETAILED DESCRIPTION OF THE INVENTION

If instead of being used according to the process of the invention, the chain-extending agents of the invention are added to the polyisocyanates or NCO preadducts in dissolved form, they behave in the same way as typical aromatic diamines. That is, the reaction mixture crosslinks after a few seconds and the resultant gel-like product can no longer be processed. Thus, the inherent chemical reactivity of the chain-extending agent (which is present in heterogeneous phase when used according to the invention) towards NCO groups of the polyisocyanates or of the relatively high molecular weight preadducts is of only minor importance to the long pot life of the reaction mixtures according to the invention. Rather, the crosslinking rate depends to a large extent on the tendency of the diamines to dissolve in the reaction mixture. Accordingly, the stability of the reaction mixtures in storage also depends to a large extent on the nature of the starting products, for example, the polyols on which the NCO preadduct is based. By using suitable polyols, it is possible to influence desirably the crosslinking time or crosslinking temperature of the mixtures.

If, for example, commercially available polypropylene glycol ethers (that is, polyethers of propylene oxide and water) are used for the preparation of the NCO preadducts, one-component systems stable in storage at room temperature are obtained in admixture with suitable diamines. However, such mixtures cure at the predetermined temperatures only after prolonged application of heat. Uncontrollable secondary reactions involving the NCO preadduct (for example, trimerization or allophanatization) can take place in the meantime, thereby producing unsatisfactory elastomers. However, this long curing time can be shortened by using, for example, polypropylene glycol ethers additionally containing ethylene oxide units as starting components. The character of the one-component system is not affected. On the other hand, the use of pure polypropylene glycol ethers is advisable when the component containing $NH_2$ groups shows slightly better solubility than described above.

The same observations also apply when polyesters (for example, polyadipate) are used for the preparation of the NCO preadduct. For polyesters, the processing characteristics of the mixtures can be considerably influenced by the choice of the low molecular weight glycols (that is, the esterification components).

Under no circumstances, however, should the reaction mixtures be allowed to thicken prematurely through premature polyaddition during mixing of the two reaction components (NCO preadduct and aromatic diamine) at room temperature or slightly elevated temperature.

On an industrial scale, the simplest representative of this class of compounds may readily be synthesized by the following method. The hydroquinone bis(hydroxyethyl) ether (1), which can be obtained by the reaction of two moles of ethylene oxide and one mole of p-hydroquinone, reacts with sodium hydroxide and two moles of p-nitrochlorobenzene in a suitable solvent according to methods known to those skilled in the art, such as that described in DE 3,722,499 (believed to correspond to U.S. Pat. No. 4,870,499, which is incorporated by reference). After isolation, the resultant nitro derivative (2) is hydrogenated to give the diamine end product (3) (m.p. 215° C.).

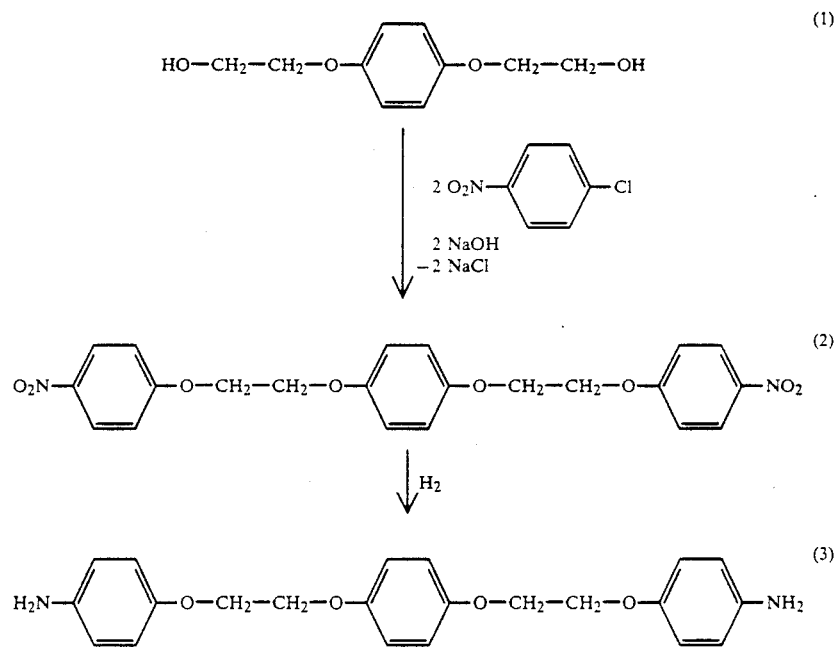

The diamines, which are obtained in solid form, are generally finely ground (for example, in a ball mill) until they have an average particle size of about 1 to about 100 μm (preferably 1 to 50 μm) (μm = micrometers).

Preferred starting materials for the preparation of the chain-extending agents containing $NH_2$ groups include 2-nitrochlorobenzene, 2-nitrofluorobenzene, 4-nitrochlorobenzene, 4-nitrofluorobenzene, 1-methyl-2-nitro-3-chlorobenzene, 1-methyl-2-nitro-3-fluorobenzene, 1-methyl-4-nitro-5-chlorobenzene, 1-methyl-4-nitro-5-fluorobenzene, 1-methyl-2-nitro-6-chlorobenzene, and 1-methyl-2-nitro-6-fluorobenzene. 4-Nitrochlorobenzene and 2-nitrochlorobenzene are particularly preferred.

Mixtures of the above-mentioned diamines with other known polyurethane chain-extending agents containing at least two isocyanate-reactive hydrogen atoms and having a molecular weight of 60 to 400 may, of course, also be used.

The solid diamine compounds described above may also be used in retarded form (for example, in accordance with German Offenlegungsschrift 3,429,149, believed to correspond to U.S. Pat. No. 4,663,415) to prepare heat-stable polyurethane ureas by the process of the invention. Thus, before they are used as chain-extending agents, the diamine compounds may be treated with small quantities of a suitable polyisocyanate, for example, in an inert solvent or preferably in suspension in a high molecular weight polyol. A thin polyurea shell is thus formed on the particle surface of the diamines, where it acts as an anti-diffusion layer. This anti-diffusion layer is destroyed by warming to a certain temperature and curing of the mixture is initiated. Reactive systems having a distinctly longer pot life than systems in which the chain-extending agent is not provided with an anti-diffusion layer are obtained with the diamine compounds thus modified (i.e., retarded) either in powder form or suspended in polyol, in combination with NCO preadducts.

Preferred isocyanate-reactive compounds (a) for the preparation of the NCO-containing preadducts are polyhydroxyl compounds having a molecular weight in the range from about 400 to about 10,000 (preferably from 600 to 6,000). Suitable polyhydroxyl compounds of this type include polyesters, polyethers, polythioethers, polyacetals, polycarbonates, and polyesteramides containing at least two (preferably two to four) hydroxyl groups of the types known for use in the preparation of homogeneous and cellular polyurethanes.

Suitable polyesters containing hydroxyl groups include reaction products of polyhydric (preferably dihydric and, optionally, trihydric) alcohols with polybasic (preferably dibasic) carboxylic acids. Instead of using polycarboxylic acids in the free acid form, it is also possible to use corresponding polycarboxylic anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted (for example by halogen atoms) and/or unsaturated. Examples of suitable carboxylic acids and their derivatives are succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimeric and trimeric fatty acids (such as oleic acid), optionally in admixture with monomeric fatty acids, terephthalic acid dimethyl ester, and terephthalic acid bis-glycol ester. Suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexane dimethanol (i.e., 1,4-bis(hydroxymethyl)cyclohexane), 2-methyl-1,3-propanediol, glycerol, trimethylolpropane, 1,2,6-hexanetriol, 1,2,4-butanetriol, trimethylolethane, pentaerythritol, quinitol, mannitol and sorbitol, methyl glycoside, diethylene glycol, triethylene glycol, tetraethylene glycol, polyethylene glycol, dipropylene glycol, polypropylene glycols, dibutylene glycol, and polybutylene glycols. The polyesters may contain terminal carboxyl groups. Polyesters of lactones, such as ε-caprolactone, or of hydroxycarboxylic acids, such as ω-hydroxycaproic acid, may also be used. These polyester diols are preferred.

Suitable polyethers containing at least 2 (generally 2 to 8 and preferably 2 to 3) hydroxyl groups are known and can be prepared, for example, by the polymerization of epoxides, optionally, in the presence of a catalyst such as $BF_3$, or by the chemical addition of these epoxides, optionally as mixtures or successively, to starter components containing reactive hydrogen atoms. Suitable epoxides include ethylene oxide, propylene oxide, butylene oxide, tetrahydrofuran, styrene oxide, or epichlorohydrin. Suitable starter components include water, alcohols, or amines, including, for example, ethylene glycol, 1,3-propylene glycol or 1,2-propylene glycol, trimethylolpropane, 4,4'-dihydroxydiphenylpropane, aniline, ammonia, ethanolamine, or ethylenediamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups.

Suitable polythioethers include the condensation products obtained by the reaction of thiodiglycol, either alone or with other glycols, dicarboxylic acids, formaldehyde, aminocarboxylic acids, or amino alcohols. The products obtained are polythio-mixed ethers, polythioether esters, or polythioether ester amides, depending on the components used.

Suitable polyacetals include compounds obtained from the condensation of glycols, such as diethylene glycol, triethylene glycol, 4,4'-dihydroxydiphenylmethane, and hexanediol, with formaldehyde. Suitable polyacetals can also be obtained by the polymerization of cyclic acetals.

Suitable polycarbonates containing hydroxyl groups are known and can be prepared, for example, by the reaction of diols, such as 1,3-propanediol, 1,4-butanediol, 1,6-hexanediol, diethylene glycol, triethylene glycol, or tetraethylene glycol, with diarylcarbonates such as diphenylcarbonate or with phosgene.

Suitable polyesteramides and polyamides include the predominantly linear condensates obtained, for example, from polybasic saturated and unsaturated carboxylic acids or their anhydrides and polyhydric saturated and unsaturated amino alcohols, diamines, polyamines, and mixtures thereof.

Polyhydroxyl compounds already containing urethane or urea groups and optionally modified natural polyols, such as castor oil or carbohydrates (such as starch), may also be used. Addition products of alkylene oxides with phenol-formaldehyde resins or even with urea-formaldehyde resins may also be used in the process of the invention.

Representatives of the above-mentioned compounds suitable for use in accordance with the invention are described for example, in *High Polymers*, Vol. XVI; *Polyurethanes, Chemistry and Technology* by Saunders and Frisch, Interscience Publishers, New York, London, Volume I, 1962, pages 32–42 and 44–54 and Volume II, 1964, pages 5–6 and 198–199; and *Kunststoff-Handbuch*, Volume VII, edited by Vieweg and Höchtlen, Carl-Hanser-Verlag, Munich, 1966, pages 45–71.

It is, of course, possible to use mixtures of such compounds containing at least two isocyanate-reactive hydrogen atoms and having a molecular weight of from 400 to 10,000, for example, mixtures of polyethers and polyesters.

Suitable compounds for use as starting component (b) are aliphatic, cycloaliphatic, araliphatic, aromatic, and heterocyclic polyisocyanates of the type described, for example, by W. Siefken in *Justus Liebigs Annalen der Chemie*, 562, pages 75 to 136. Examples of suitable such polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and -1,4-diisocyanate and mixtures of these isomers, 1-isocyanato-3,3,5-trimethyl-5-isocyanatomethylcyclohexane (German Auslegeschrift 1,202,785), 2,4- and 2,6-hexahydrotolylene diisocyanate and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate, naphthylene-1,5-diisocyanate, triphenylmethane-4,4',4"-triisocyanate, polyphenyl polymethylene polyisocyanates of the type obtained by condensing aniline with formaldehyde, followed by phosgenation and described, for example, in British Patents 874,430 and 848,671, perchlorinated aryl polyisocyanates of the type described, for example, in German Auslegeschrift 1,157,601, polyisocyanates containing carbodiimide groups of the type described in German Patentschrift 1,092,007, norbornane diisocyanates such as described in U.S. Pat. No. 3,492,330, polyisocyanates containing allophanate groups of the type described, for example, in British Patent 994,890, Belgian Patent 761 626, and published Dutch Patent Application 7,102,524, polyisocyanates containing isocyanate groups of the type described, for example, in German Patentschriften 1,022,789, 1,222,067, and 1,027,394 and German Offenlegungsschriften 1,929,034 and 2,004,048, polyisocyanates containing urethane groups of the type described, for example, in Belgian Patent 752,261 or U.S. Pat. No. 3,394,164, polyisocyanates containing acylated urea groups according to German Patentschrift 1,230,778, polyisocyanates containing biuret groups of the type described, for example, in German Patentschrift 1,101,394, British Patent 889,050, and French Patent 7,017,514, polyisocyanates produced by telomerization reactions of the type described, for example, in Belgian Patent 723,640, polyisocyanates containing ester groups of the type described, for example, in British Patents 965,474 and 1,072,956, U.S. Pat. No. 3,567,763 and German Patentschrift 1,231,688, and also reaction products of the above-mentioned diisocyanates with acetals according to German Patentschrift 1,072,385. It is also possible to use the isocyanate-group containing distillation residues obtained in the commercial production of isocyanates, optionally in solution in one or more of the above-mentioned polyisocyanates. It is also possible to use mixtures of the above-mentioned polyisocyanates.

In general, it is particularly preferred to use the commercially readily available polyisocyanates, such as 2,4- and 2,6-tolylene diisocyanate, and mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates").

The polyisocyanates or the isocyanate prepolymers prepared from the polyisocyanates mentioned above and the relatively high molecular weight and/or low molecular weight polyols mentioned above should be present in liquid form during the reaction with the powdered or suspended aromatic diamine.

If polyurethane foams are to be prepared by the process of the invention, water and/or readily volatile organic substances are used as blowing agents. Organic blowing agents include acetone, ethyl acetate, methanol, ethanol, halogen-substituted alkanes (such as methylene chloride, chloroform, ethylidene chloride, vinylidene chloride, monofluorotrichloromethane, chlorodifluoromethane, and dichlorodifluoromethane), butane, hexane, heptane, or diethyl ether. A blowing effect may also be obtained by adding compounds which decompose at temperatures above room temperature and thereby give off gases such as nitrogen, for example, azo compounds such as azoisobutyronitrile. Other examples of blowing agents and information on their use can be found in *Kunststoff-Handbuch*, Volume VII, edited by Vieweg and Höchtlen, Carl-Hanser-Verlag, Munich, 1966, for example, on pages 108–109, 453–455, and 507–510.

Catalysts may often also be used in the process of the invention. Suitable catalysts are known and include tertiary amines, such as triethylamine, tributylamine, N-methylmorpholine, N-ethylmorpholine, N,N,N',N'-tetramethyl ethylenediamine, 1,4-diazabicyclo[2.2.2]octane, N-methyl-N'-(dimethylaminoethyl)piperazine, N,N-dimethylbenzylamine, bis(N,N-diethylaminoethyl) adipate, N,N-diethyl benzylamine, pentamethyl diethylenetriamine, N,N-dimethylcyclohexylamine, N,N,N',N'-tetramethyl-1,3-butanediamine, N,N-dimethyl-β-phenylethylamine, 1,2-dimethylimidazole, and 2-methylimidazole.

Suitable tertiary amine catalysts containing isocyanate-reactive hydrogen atoms include triethanolamine, triisopropanolamine, N-methyldiethanolamine, N-ethyldiethanolamine, N,N-dimethylethanolamine, and reaction products thereof with alkylene oxides, such as propylene oxide and/or ethylene oxide.

Other suitable catalysts are sila-amines containing carbon-silicon bonds, of the type described, for example, in German Patentschrift 1,229,290. Suitable such compounds include 2,2,4-trimethyl-2-silamorpholine and 1,3-diethylaminomethyl tetramethyldisiloxane.

Other suitable catalysts include nitrogen-containing bases, such as tetraalkylammonium hydroxides; alkali hydroxides, such as sodium hydroxide; alkali phenolates, such as sodium phenolate; or alkali alcoholates, such as sodium methylate. Hexahydrotriazines may also be used as catalysts.

It is also possible to use organometallic compounds, particularly organotin compounds, as catalysts according to the invention. Preferred organotin compounds are tin(II) salts of carboxylic acids, such as tin(II) acetate, tin(II) octoate, tin(II) ethylhexoate, and tin(II) laurate, and the dialkyltin salts of carboxylic acids, such as dibutyltin diacetate, dibutyltin dilaurate, dibutyltin maleate, or dioctyltin diacetate.

Further representatives of suitable catalysts and information on the way in which they work can be found in *Kunststoff-Handbuch*, Volume VII, edited by Vieweg and Höchtlen, Carl-Hanser-Verlag, Munich, 1966, for example, on pages 96–102.

The catalysts are generally used in a quantity of from about 0.001 to about 10% by weight, based on the total quantity of polyhydroxyl compounds (a) having a molecular weight of 400 to 10,000.

Surface-active additives (emulsifiers and foam stabilizers) may also be used in the process of the invention.

Suitable emulsifiers include the sodium salts of castor oil sulfonates or even of fatty acids or salts of fatty acids with amines, such as diethylamine oleate or diethanolamine stearate. Alkali or ammonium salts of sulfonic acids, such as dodecylbenzenesulfonic acid or dinaphthylmethanedisulfonic acid, or of fatty acids, such as ricinoleic acid, or of polymeric fatty acids may also be used as surface-active additives. Suitable foam stabilizers are preferably polyether siloxanes. The structure of these compounds is generally such that a copolymer of ethylene oxide and propylene oxide is attached to a polydimethylsiloxane residue. Foam stabilizers such as these are described, for example, in U.S. Pat. No. 2,764,565.

It is also possible to use reaction retarders, for example, acidic substances such as hydrochloric acid or organic acid halides; known cell regulators, such as paraffins or fatty alcohols or dimethylpolysiloxanes; pigments or dyes; known flameproofing agents, such as tris(chloroethyl) phosphate or ammonium phosphate and polyphosphate; stabilizers against the effects of aging and weather; plasticizers; fungistatic and bacteriostatic substances; and fillers, such as barium sulfate, kieselguhr, carbon black, or whiting.

Further examples of surface-active additives and foam stabilizers, cell regulators, reaction retarders, stabilizers, flameproofing agents, plasticizers, dyes, fillers, and fungistatic and bacteriostatic substances that can optionally be used in accordance with the invention and information on the way in which these additives are used and their respective modes of action can be found in *Kunststoff-Handbuch,* Volume VI, edited by Vieweg and Höchtlen, Carl-Hanser-Verlag, Munich, 1966, for example, on pages 103-113.

In the process of the invention, the reaction components are reacted by the known one-shot process, the prepolymer process, or the semiprepolymer process, often using machines such as the type described in U.S. Pat. No. 2,764,565. Information on processing machines that can also be used in accordance with the invention can be found in *Kunststoff-Handbuch,* Volume VI, edited by Vieweg and Höchtlen, Carl-Hanser-Verlag, Munich, 1966, for example, on pages 121-205.

In the process of the invention, the quantities in which the reaction components are used are generally selected so that the molar ratio of the amount of polyisocyanates to the combined amount of the chain-extending agent and the compound containing reactive OH groups is generally between about 0.7 and about 1.5 (preferably between 0.90 and 1.15), depending on the particular method used for processing. When a prepolymer stage is involved, the percentage NCO content of the prepolymer may be from about 1.8 to about 6% by weight. The molar ratio of reactive hydrogen of the chain-extending agent to reactive OH groups may vary within wide limits and should preferably be between 0.4 and 1.5 when flexible to rigid polyurethanes are to be obtained. In addition to the diamines used in accordance with the invention, other diamines or even diols (for example, those of the type mentioned above in connection with the preparation of the polyhydroxyl compounds) may also be used as a part of the chain-extending agents. However, the molar fraction of the amine of the invention in the chain-extending agent should be between about 1 and about 0.5 (preferably between 1 and 0.8).

The process according to the invention may even be carried out in two stages. The polyol component containing at least two hydroxyl groups and having a molecular weight of 400 to 10,000 can be reacted in known manner with an excess of diisocyanate to form a preadduct containing NCO groups. The course of the reaction may be monitored by NCO titration. After the polyaddition is completed, the diamine is introduced in the form of a solid powder (particle size of about 5 to about 50 $\mu$m) using a suitable stirrer and the resultant suspension is thoroughly mixed. The solid diamine powder may, however, also first be mixed in a small quantity of the high molecular weight liquid polyol on which the NCO preadduct is based. The preferred ratio by weight of diamine to polyol is from about 1:0.5 to about 5.0:1 (preferably from 1:1 to 2:1). Preferred polyhydroxyl compounds are those in which the aromatic diamine is insoluble or only poorly soluble at relatively low temperatures (e.g., below about 100° C.) but in which the aromatic diamine becomes substantially soluble upon warming to the curing temperature (e.g., about 130° to about 200° C.). The resulting paste or pourable suspension may then be added to the NCO preadduct to form a heterogeneous mixture that can subsequently be cured. An advantage of this process is the ease at which it can be carried out.

The reaction components may also be reacted by the one-shot process. In this process, the starting components (that is, a high molecular weight polyol, the polyisocyanate, the solid diamine and, optionally, the auxiliaries and additives) may be reacted after mixing by bringing the mixture to the necessary curing temperature (i.e., about 140° to about 200° C.). Curing, however, may even take place in steps, in the first of which the reaction of the polyisocyanate with the polyol is carried out at a relatively low temperature (i.e., about 60° to about 100° C.) that is below the melting temperature of the solid diamine and at which temperature the solid diamine is only poorly soluble and does not react. A material that is moldable under pressure is initially obtained. Final curing may then take place at any time, the final physical values being reached at about 150° to about 180° C. (see Examples).

The temperature at which the chain-extending agent is added depends on the physical state of the NCO preadduct. With liquid NCO preadducts, the chain-extending agent is added, either in bulk or preferably in a polyol suspension, at room temperature. With highly active or solid NCO prepolymers, the chain-extending agent is added at a temperature at which satisfactory casting of the mixtures is guaranteed, generally in the range from about 60° to about 80° C. Under no circumstances should a premature reaction involving the NCO prepolymer and the aromatic diamine be allowed to take place, because any uncontrollable increase in the viscosity of the mixture would complicate further processing by the standard casting method. This restriction should, however, be distinguished from preliminary reactions of a stepwise preparation in which small portions of an aromatic diaminepolyol suspension can be mixed with the starting polyisocyanate in quantities such that only 0.05 to 20% $NH_2$ equivalents of the aromatic diamine react initially with the polyisocyanate.

The reaction mixture is degassed in vacuo shortly after addition of the diamine.

The processing of the reactive systems according to the invention depends on their physical state. Liquid systems that are pourable at room temperature can be processed by casting, optionally being briefly heated before processing, for example, to about 50° to about 70° C. Systems which are not pourable, but which still can flow, may be applied to desired substrates, for example, by means of a coating knife, and subsequently cured by heat shock. Plastic systems (pastes) may be molded under heat and pressure. Solid systems, particularly those based on relatively high-melting starting polyols (i.e., melting at about 45° to about 65° C.), are processed either under pressure in molds (injection molding) or at or above the melting temperature of the polyol. For example, the long-term stability systems prepared beforehand may be introduced in the form of solid granules into a mold heated above the melting point of the polyol (generally below about 70° C.). After the granules are melted and the mold is filled, the mold is heated to about 130° to about 200° C. and the contents cured. The curing temperature of the reactive systems of the invention is in the range from about 130° to about 200° C.

Elastomers prepared according to the invention may be used for a variety of purposes, for example, for moldings subjected to severe mechanical stressing, such as tires, rollers, V-belts, or seals that are exposed to severe thermal or chemical stressing, for hot water pipes or motors, or for the production of films, textile coatings, and polyurethane powders.

The chain-extending reaction may even be carried out in the presence of the blowing agents and additives described above, preferably in closed molds, thereby forming foams having a cellular core and a compact skin.

The elastic and semi-elastic foams that can be obtained by the process of to the invention are used, for example, as upholstery materials, mattresses, and packaging materials. By virtue of their flame resistance, the elastic and semi-elastic foams can also be used for applications in which these properties are particularly important, for example, in vehicle and aircraft construction and in transport in general. The foams may either be produced by foam molding or may be made up from slabstock foam.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

EXAMPLE 1 (Prepolymer process)

General procedure

The NCO-terminated preadducts were prepared by known methods from 1 mole of polyol and 2 moles of 2,4-diisocyanatotoluene ("TDI") at 60°-80° C. The course of each polyaddition reaction was followed by simple NCO titration. For one preadduct (the product prepared from polyol (b)), residual monomeric TDI that was still present in small quantities was removed using a thin-layer evaporator.

To produce the elastomers, the appropriate NCO preadduct (200 g) was thoroughly degassed with stirring at 50°-60° C. under aspirator vacuum. The diamine was then added to the NCO preadduct as a fine powder (particle size 5-50 μm). The molar ratio of NCO to OH was 1.1:1. The resultant NCO preadduct-diamine suspension could be satisfactorily processed at the temperature designated in the Table below and was thoroughly homogenized with further degassing. The reactive systems ultimately obtained were stable in storage for a few months in the absence of atmospheric moisture, both at room temperature and at elevated temperature, and showed no significant increase in viscosity during storage.

Curing took place at a temperature of 150° to 180° C. The mixtures were poured into a mold coated with release agent and were kept at 170° to 180° C. for 2 to 4 hours. Each test specimen was then removed from the hot mold. After storage for several days at room temperature, the moldings had the properties shown in the Table below.

In the Examples, a diamine corresponding to the formula

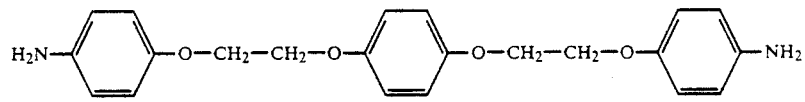

(1,4-bis(2-(4-aminophenoxy)ethoxy)benzene) was used as the chain-extending agent containing NH$_2$ groups. This material was prepared, as discussed above, by the method of U.S. Pat. No. 4,870,206, for example by reaction of 1,4-bis-(2-hydroxyethoxy)-benzene with o- or p-chloronitrobenzene in the presence of alkaline and polar-aprotic solvent, and in a second step followed hydrogenation of the nitro groups to the amino groups.

The following polyols were used for the preparation of the NCO preadducts (using 2,4-diisocyanatotoluene as the polyisocyanate component):

(a) Polyester of adipic acid and ethylene glycol (molecular weight 2,000, OH value 56) Isocyanate content of NCO preadduct of 3.85%

(b) Polyester of adipic acid and a mixture of ethylene glycol and 1,4-butanediol (molar ratio 1:1) (molecular weight 2,000, OH value 56) Isocyanate content of NCO preadduct of 3.3% (after removal of TDI using a thin-layer evaporator)

(c) Polyester (hexanediol polyether ester carbonate) of diphenyl carbonate and a polycondensate of 1,6-hexanediol (molecular weight 2,000, OH value 56) (see German Offenlegungsschrift 3,717,060, believed to correspond to U.S. Pat. No. 4,808,691) Isocyanate content of NCO preadduct of 3.5%

(d) Polycaprolactone (molecular weight 2,000, OH value 56) Isocyanate content of NCO preadduct of 3.6% NCO (e) Polytetrahydrofuran-etherdiol (molecular weight 2,000, OH value 56) Isocyanate content of NCO preadduct of 3.5%

(f) Polypropylene glycol ether (molecular weight 2,000, OH value 56)

The mechanical properties of the elastomers prepared batchwise using 200 g of each preadduct are shown in the following Table.

TABLE

MECHANICAL PROPERTIES OF ELASTOMERS

| | Starting Polyols | | | | | |
|---|---|---|---|---|---|---|
| | (a) | (b) | (c) | (d) | (e) | (f) |
| Preadduct NCO content (%) | 3.85 | 3.3 | 3.5 | 3.6 | 3.5 | 3.5 |
| Quantity of diamine (g) | 31.6 | 27.0 | 28.7 | 29.5 | 28.7 | 28.7 |
| Modulus 100% (MPa) | 7.4 | 7.0 | 5.5 | 6.2 | 4.5 | 2.5 |
| Modulus 300% (MPa) | 16.1 | 12.5 | 9.8 | 11.1 | 8.5 | 4.0 |
| Tensile strength (MPa) | 40.7 | 45.8 | 21.8 | 24.4 | 15.8 | 8.5 |
| Elongation at break (%) | 550 | 480 | 400 | 400 | 380 | 480 |
| Tear propagation resistance (KN/m) | 85.8 | 67.9 | 42.8 | 45.5 | 28.2 | 26.7 |
| Elasticity (%) | 40 | 45 | 50 | 52 | 58 | 38 |
| Shore A Hardness | 92 | 90 | 87 | 91 | 84 | 72 |

EXAMPLE 2 (One-shot process)

A linear polyester based on adipic acid and ethylene glycol (molecular weight 2,000, OH value 56) (200 g, 0.1 mole) was melted at 50° to 60° C. First 1,4-butanediol (4.5 g, 0.05 mole) and then 1,4-bis(2-(4-aminophenoxy)ethoxy)benzene (19.0 g) were added in solid form with stirring to the polyester. A total of 0.3 mole of OH groups and 0.1 mole of NH2 groups is available for polyaddition with the isocyanate. To crosslink the OH component (i.e., the polyester and 1,4-butanediol), molten 4,4'-diisocyanatodiphenylmethane ("MDI") (37.5 g, 0.15 mole) was stirred in, and, for the NH2 component (i.e., the diamine), 1,5-diisocyanatonaphthalene ("NDI") (10.5 g, 0.05 mole) was stirred in as a powder. The melt suspension flowed freely at 50° to 60° C. and, accordingly, could be poured into a mold provided with glass fiber mats. A crosslinked, but thermoplastic material, in which the glass fiber mats were embedded, was obtained after a few hours at approximately 60° C. The reaction of the OH components with the MDI was largely over but the aromatic diamine was still unreacted. This pre-product ("prepreg") was stable in storage in the absence of atmospheric moisture both at room temperature and at elevated temperature but could be cured at any time. The prepreg was cured by molding under pressure at a crosslinking temperature of 150° to 180° C., yielding a glass-fiber-reinforced, tough end product having a Shore A hardness of 92 to 94 and particularly high thermal stability.

EXAMPLE 3 (Semiprepolymer process)

A semiprepolymer containing NCO groups (NCO content 4.9%, theoretical 5.0%) was obtained by a reaction of 800 g of a linear polyether polyol (prepared by addition of propylene oxide with water and having a molecular weight of 2,000 and an OH value of 56) with 258 g of 4,4'-diisocyanatodiphenylmethane at 80° C. using the usual method.

A 105 g portion of this semiprepolymer was thoroughly mixed at room temperature with 20 g of the solid diamine described in Example 1. The suspension, which is stable in storage at room temperature, was degassed under aspirator vacuum. The liquid reactive system was poured into a mold coated with release agent and then heated to 180° C. After 2 hours, the mixture cured and the molding could be removed from the mold.

An elastic polyurethane urea elastomer having a good surface and a Shore A hardness of 90 was obtained.

What is claimed is:
1. A process for the preparation of a polyurethane urea elastomer comprising reacting
   (a) a compound containing at least two isocyanate-reactive groups and having a molecular weight in the range from 400 to 10,000;
   (b) a polyisocyanate; and
   (c) an aromatic diamine corresponding to the formula

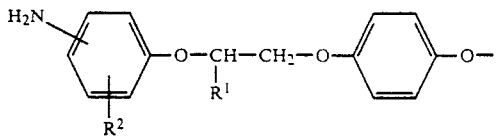

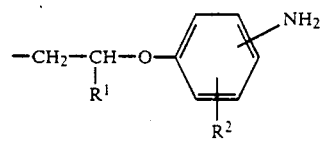

wherein $R^1$ and $R^2$ are independently hydrogen or alkyl.

2. A process according to claim 1 additionally comprising
   (d) auxiliaries and additives.

3. A process according to claim 1 wherein compound (a) has a molecular weight in the range from about 400 to about 6,000.

4. A process according to claim 1 wherein $R^1$ and $R^2$ are independently hydrogen or $C_1$-$C_6$ alkyl.

5. A process according to claim 1 wherein $R^1$ and $R^2$ are independently hydrogen or methyl.

6. A process according to claim 1 wherein aromatic diamine (c) is used as a powder suspended in a portion of component (a) and wherein components (a), (b), and (c) are initially mixed at a temperature below the melting point of said aromatic diamine.

7. A process according to claim 1 wherein an NCO preadduct is initially prepared from components (a) and (b) and wherein aromatic diamine (c) is added as a powder to said NCO preadduct.

8. A process according to claim 1 wherein component (a) is a polyhydroxyl compound in which aromatic diamine (c) is only poorly soluble at temperatures below 100° C. but in which aromatic diamine (c) is substantially soluble at temperatures of from 130° to 200° C.

9. A process according to claim 1 wherein component (a) is a polyester having a molecular weight of 400 to 10,000.

10. A process according to claim 9 wherein the polyester has a molecular weight of 400 to 6,000.

11. A process according to claim 1 wherein aromatic diamine (c) is 1,4-bis(2-(4-aminophenoxy)ethoxy)benzene having the formula

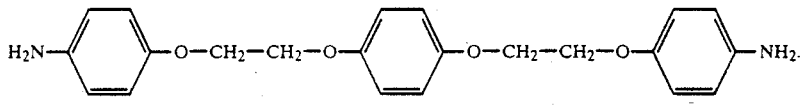

12. A process according to claim 1 wherein aromatic diamine (c) is used as a powder having a particle size of 1 to 100 μm.

13. A process according to claim 1 wherein aromatic diamine (c) is used as a powder having a particle size of 1 to 50 μm.

14. A process according to claim 1 wherein a suspension is formed by mixing aromatic diamine (c) in powder form with a portion of component (a) in quantities such that the ratio by weight of said aromatic diamine (c) to component (a) is from 1.0.5 to 5:1.

15. A process according to claim 14 wherein the ratio by weight of aromatic diamine (c) to component (a) is from 1.0:1.0 to 2.0.

16. A process according to claim 14 wherein the suspension is added as a chain-extending agent to polyisocyanate (b) and the remaining portion of component (a).

17. A process according to claim 14 wherein the suspension is mixed with polyisocyanate (b) in quantities such that 0.05 to 20% NH₂ equivalents of aromatic diamine (c) react in an initial reaction with said polyisocyanate (b).

18. A heterogeneous mixture comprising a mixture of (A) an NCO-terminated preadduct, wherein said preadduct is prepared by reacting
  (a) a compound containing at least two isocyanate-reactive groups and having a molecular weight in the range from 400 to 10,000 and
  (b) a polyisocyanate, and (B) an aromatic diamine corresponding to the formula

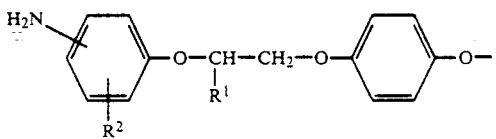

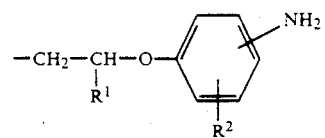

wherein $R^1$ and $R^2$ are independently hydrogen or alkyl.

* * * * *